(12) United States Patent
Kelch et al.

(10) Patent No.: US 6,663,974 B2
(45) Date of Patent: Dec. 16, 2003

(54) STRUCTURES CONTAINING A NON-ORIENTED MULTILAYER FILM WITH A POLYOLEFIN CORE

(75) Inventors: Robert H. Kelch, Midland, MI (US); Robert L. McGee, Midland, MI (US)

(73) Assignee: Dow Global Technology Inc., Midland, MI (US)

( * ) Notice: Subject to any disclaimer, the term of this patent is extended or adjusted under 35 U.S.C. 154(b) by 173 days.

(21) Appl. No.: 09/966,657

(22) Filed: Sep. 29, 2001

(65) Prior Publication Data

US 2002/0068182 A1 Jun. 6, 2002

Related U.S. Application Data

(60) Provisional application No. 60/251,676, filed on Dec. 6, 2000.

(51) Int. Cl.[7] .......................... B32B 27/36; B32B 27/32
(52) U.S. Cl. .................. 428/461; 428/458; 428/483; 428/516; 428/518; 428/520
(58) Field of Search .................. 428/516, 518, 428/520, 483, 458, 461

(56) References Cited

U.S. PATENT DOCUMENTS

| | | |
|---|---|---|
| 3,925,591 A | 12/1975 | Breitenfellner et al. |
| 4,188,443 A | 2/1980 | Mueller et al. |
| 4,424,256 A | 1/1984 | Christensen et al. |
| 4,705,707 A | 11/1987 | Winter |
| 4,716,061 A | 12/1987 | Winter |
| 4,945,008 A | 7/1990 | Heyes et al. |
| 4,957,820 A * | 9/1990 | Heyes et al. ................. 428/623 |
| 4,980,210 A * | 12/1990 | Heyes ........................ 428/35.9 |
| 5,093,208 A * | 3/1992 | Heyes et al. ................. 428/623 |
| 5,151,317 A | 9/1992 | Both |
| 5,225,482 A | 7/1993 | Nakagawa et al. |
| 5,324,467 A | 6/1994 | Anderson |
| 5,637,366 A | 6/1997 | Davis et al. |
| 5,750,252 A | 5/1998 | Danner et al. |
| 5,830,545 A * | 11/1998 | Frisk ........................ 428/34.7 |
| 6,027,776 A | 2/2000 | Mueller |
| 6,500,505 B2 * | 12/2002 | Piper et al. ................. 428/34.8 |

FOREIGN PATENT DOCUMENTS

| | | |
|---|---|---|
| EP | 0321172 | 6/1989 |
| JP | 63-154330 | 6/1988 |
| JP | 07-186326 | 7/1995 |
| WO | WO 95/32095 | 11/1995 |
| WO | WO 96/25292 | 8/1996 |
| WO | WO 02/45957 A1 * | 6/2001 |

* cited by examiner

Primary Examiner—D. Lawrence Tarazano
(74) Attorney, Agent, or Firm—Steven W. Mork

(57) ABSTRACT

Structures of the present invention contain a non-oriented multilayer film with a polyolefin core having 40 weight-percent or less homogeneous ethylene/alpha-olefin, a modified polyolefin tie layer on each side of the core, and an adhesive layer on at least one tie layer. The adhesive layer contains a polar-modified polyolefin and a polyester, copolyester, or polyester/copolyester blend. The multilayer film has utility as a protective coating for metal surfaces.

19 Claims, No Drawings

STRUCTURES CONTAINING A NON-ORIENTED MULTILAYER FILM WITH A POLYOLEFIN CORE

CROSS REFERENCE STATEMENT

This application claims the benefit of U.S. Provisional Application No. 60/251,676, filed Dec. 6, 2000.

BACKGROUND OF THE INVENTION

1. Field of the Invention

The present invention relates to structures containing a non-oriented multilayer film comprising a polyolefin core. The multilayer film is particularly useful as a protective coating for metal surfaces.

2. Description of Related Art

Multilayer polymeric films having polyolefin cores have utility, for example, as moisture barriers, adhesive structures, packaging materials, and as protective coatings for metal surfaces. The polyolefin core enhances the moisture barrier properties and flexibility of the film. Examples of multilayer polymeric films having polyolefin cores include those disclosed in the following U.S. patents.

U.S. Pat. No. 4,188,443 discloses an optically clear multilayer polyester/polyolefin shrink film. The shrink film is oriented after formation so as to establish shrink tension in at least one direction. Shrink tension is disadvantageous in a film coated on a substrate, such as a metal surface, since the film tends to delaminate from the substrate as the shrink tension is relieved.

U.S. Pat. No. 4,705,707 discloses a non-oriented, heat-sealable, co-extruded, three- or five-layer moisture barrier film. The film has an "ABC" or "ABCBA" structure where layer "A" is a polyester, copolyester or blend thereof. Unfortunately, polyesters and copolyesters do not offer optimal adhesion to modified polyolefin layers, tend to be costly, and tend to absorb moisture.

U.S. Pat. No. 4,716,061 discloses a non-oriented, heat-sealable, co-extruded, three- or five-layer moisture barrier film similar to U.S. Pat. No. 4,705,707 except where layer "C" comprises polypropylene instead of polyethylene.

U.S. Pat. No. 6,027,776 discloses a five-layer film useful for packaging and administering medical solutions. The five-layer film comprises an interior layer, first and second exterior layers, and first and second adhesive layers between the interior layer and the first and second exterior layers, respectively. The interior layer consists of homogeneous ethylene/alpha-olefin copolymer or blends of homogeneous ethylene/alpha-olefin copolymers. Homogeneous ethylene/alpha-olefin copolymers are more expensive than alternative polyolefins. Homogeneous ethylene/alpha-olefin copolymers also tend to be less thermally stable than heterogeneous polymers.

A multilayer film that has the moisture barrier properties and flexibility provided by a polyolefin core yet is non-oriented so as to minimize shrink tension is desirable. A non-oriented multilayer film further comprising an adhesive layer that overcomes the disadvantages listed for polyesters and copolyesters is even more desirable. Still more desirable is a non-oriented film further comprising a core layer that comprises a polymer other than a homogeneous ethylene/alpha-olefin copolymer.

BRIEF SUMMARY OF THE INVENTION

The present invention is a structure comprising a non-oriented multilayer film, wherein said multilayer film comprises: (a) a first tie layer having opposing first and second surfaces; (b) a polyolefin core layer comprising 40 weight-percent or less homogeneous ethylene/alpha-olefin copolymer and having opposing first and second surfaces with the first surface of the core layer adhered to the first surface of the first tie layer; (c) a second tie layer having opposing first and second surfaces with the first surface of the second tie layer adhered to the second surface of the core layer; and (d) a first adhesive layer having opposing first and second surfaces with the first surface of the first adhesive layer adhered to the second surface of the second tie layer; the adhesive layer comprising a blend of polar-modified polyolefin and a polyester, copolyester, or polyester/copolyester blend. Additional layers, such as a second adhesive layer and a thermoplastic layer may be included in the multilayer film. The multilayered film may be adhered to a metal surface.

In a first preferred embodiment, the film of the present invention further comprises: (e) a second adhesive layer having opposing first and second surfaces with the first surface of the second adhesive layer adhered to the second surface of the first tie layer; (f) a thermoplastic layer comprising an oriented polyester and having opposing first and second surfaces with the first surface of the thermoplastic layer adhered to the second surface of the second adhesive layer; and (g) a primed metal surface to which the second surface of the first adhesive layer is adhered.

A second preferred embodiment is similar to the first preferred embodiment accept that thermoplastic layer (f) comprises a non-oriented amorphous or semicrystalline polyester, copolyester, or polyester/copolyester blend.

Designation of first and second surfaces herein is for ease of illustration. In general, the first and second surfaces are interchangeable so long as the surface of one layer is adhered to a proximate surface of an adjacent layer.

The film of the present invention advances the art by providing a non-oriented multilayer film with an adhesive layer comprising a blend of a polar-modified polyolefin and a polyester, copolyester, or polyester/copolyester blend and a polyolefin core layer that comprises 40 wt % or less homogeneous ethylene/alpha-olefin. The multilayer film of the present invention is particularly useful as a protective coating for metal surfaces.

Definitions

"Non-oriented multilayer film" refers to a multilayered film structure that is substantially free of post-formation orientation. However, individual layers of the non-oriented multilayer film may be oriented prior to creating the multi-layered film structure. A non-oriented multilayer film structure does not include, for example, oriented multilayered shrink films.

"Homogeneous ethylene/alpha-olefin" and "homogeneous ethylene/alpha-olefin copolymer" refer to ethylene/alpha-olefin polymerization reaction products of relatively narrow molecular weight distribution ($M_w/M_n$) and relatively narrow composition distribution, as defined in U.S. Pat. No. 6,027,776 column 5, line 66 through column 7, line 22 (incorporated herein by reference). Homogeneous ethylene/alpha-olefin copolymers are structurally different from heterogeneous ethylene/alpha-olefin copolymers in that homogeneous ethylene/alpha-olefins exhibit a relatively even sequencing of comonomers within a chain, a mirroring of sequence distribution in all chains, and a similarity of length of all chains, i.e., a narrower $M_w/M_n$. Furthermore, homogeneous ethylene/alpha-olefin copolymers are typically prepared using metallocene, or other single-site type catalysts rather than Ziegler Natta catalysts. Homogeneous ethylene/alpha-olefin copolymers generally have a $M_w/M_n$ of less than 2.7 (as determined by gel permeation chromatography, for example), a composition distribution breadth index greater than about 70 percent, and an essentially singular melting point characteristic with a peak melting point as determined by Differential Scanning Calorimetry of from about 60° C. to about 110° C.

"Heterogeneous polyolefin" refers to a polyolefin having a relatively wide $M_w/M_n$, prepared using conventional Ziegler-Natta or other heterogeneous catalysts. Heterogeneous catalysts contain several kinds of active sites which differ in Lewis acidity and steric environment. Examples of Ziegler-Natta heterogeneous catalysts include a metal halide activated by an organometallic co-catalyst, such as titanium chloride, optionally containing magnesium chloride, complexed to trialkyl aluminum. Homogeneous ethylene/alpha-olefins are not included in the definition of heterogeneous polyolefin.

Heterogeneous polyolefins can include, for example, polypropylene polymers and copolymers, linear low-density polyethylene, linear medium density polyethylene, very low-density polyethylene, ultra low-density polyethylene, and ethylene/alpha olefin resins wherein the ethylene is copolymerized with alpha-olefin monomers such as butene, hexene and octene.

DETAILED DESCRIPTION OF THE INVENTION

Non-oriented multilayer film of the present invention comprise at least four layers: (a) a first tie layer; (b) a core layer; (c) a second tie layer; and (d) a first adhesive layer. Additional optional layers include a second adhesive layer and a thermoplastic layer. The non-oriented multilayer film of the present invention can also include an adhered metal surface. Typically, non-oriented multilayer films of the present invention are translucent as opposed to transparent.

A tie layer joins a core layer to another layer. Therefore, the tie layers must be adhesively compatible with the core layer and at least one other layer. For example, a tie layer can join a core layer to an adhesive layer, requiring that the tie layer be adhesively compatible with both the core layer and adhesive layer. A tie layer can join a core layer to a metal surface, requiring that the tie layer be adhesively compatible with both the core layer and metal surface. A tie layer can join a core layer to a thermoplastic layer, requiring the tie layer to be adhesively compatible with the core layer and thermoplastic layer. A layer is "adhesively compatible" with a surface or layer if it can be adhered to that surface or layer.

The tie layers may be the same or different and comprise a polar-modified polyolefin. Polar-modified polyolefins include olefin polymers having a polar monomer copolymerized therein, an olefin polymer or copolymer grafted with an acid or anhydride, or derivatives thereof. Examples of suitable polar-modified polyolefins include ethylene/vinyl acetate copolymer (EVA); ethylene/methacrylate copolymer (EMA); ethylene/n-butyl acrylate (EnBA); ethylene/vinyl acetate/carbon monoxide (EVACO); ethylene/acrylic acid (EAA); ethylene/methacrylic acid (EMAA); ionomeric salts of ethylene/carboxylic acid copolymers such as sodium, zinc or potassium ionomers of EMAA or EAA; maleic anhydride grafted EVA (MAH-g-EVA); maleic anhydride grafted linear low-density polyethylene (MAH-g-LLDPE); and maleic anhydride grafted polypropylene (MAH-g-PP). The tie layer preferably comprises a maleic anhydride grafted polyolefin such as MAH-g-EVA, MAH-g-LLDPE, or MAH-g-PP.

Preferably, the polyolefin contains at least 0.2 weight-percent (wt %) maleic anhydride (MAH), more preferably at least 0.5 wt % MAH, based on the weight of polyolefin and less than 2.0 wt %, preferably less than 1.6 wt % MAH based on the weight of polyolefin. MAH levels below 0.2 wt % impart insufficient polarity to the polyolefin for adhering to an adhesive layer, thermoplastic layer, or metal surface. MAH levels above 2.0 wt % results in tie layers having excess crosslinking and/or excessively high viscosity.

Suitable polyolefin resins for the tie layer have a specific gravity of from about 0.88 to about 1.1 grams per cubic centimeter (g/cm$^3$). The resins have a viscosity of about 1 (one) to about 30 grams per 10 minutes (g/10 min.) as indicated by melt index (MI) measured according to American Society for Testing and Materials (ASTM) method D1238 (190° C., 2.16 kg). Each tie layer preferably comprises at least 5 percent (%), more preferably at least 10%; and preferably less than 20%, more preferably less than 15% of the total multilayer film thickness. However, in no case will the tie layer thickness be less than about 0.2 mils (5 micrometers ($\mu$m)). Layer thickness less than about 0.2 mils (5 $\mu$m) are difficult to uniformly co-extrude and will provide insufficient interlayer adhesion between adjacent layers.

The core layer comprises a polyolefin resin and contains 40 wt % or less, preferably 25 wt % or less, more preferably 10 wt % or less homogeneous ethylene/alpha-olefin copolymer. The present invention may include a core layer that is essentially, or even completely, free of homogeneous ethylene/alpha-olefin copolymer. Preferably, the core layer comprises a heterogeneous polyolefin. Suitable polyolefin resins for the core layer include polyethylene (PE) homopolymers and copolymers, polypropylene (PP) homopolymers and copolymers, or blends thereof. More preferably, the polyolefin is linear low-density polyethylene (LLDPE), high-density polyethylene (HDPE), or PP (homopolymer or copolymer). The polyolefin resin in the core layer can be non-polar to enhance water-resistance. The core can be PP-free, if desired. Most preferably, the polyolefin resin in the core is LLDPE or HDPE. The core layer optionally contains compatiblizers, such as MAH-grafted polyolefins, to improve interlayer adhesion. Suitable polyolefin resins for the core layer have a specific gravity of from about 0.88 to about 1 (one) g/cm$^3$. PE resins have a viscosity as indicated by a MI of from about 1 (one) to about 30 g/10 min., as determined by ASTM method D1238 (Conditions 190° C., 2.16 kg). PP resins will have a viscosity as indicated by melt flow rate (MFR) of about 1 (one) to about 30 g/10 min., as determined by ASTM method D1238 (230° C., 2.16 kg). Resins having a viscosity outside these ranges tend to be difficult to process.

A core layer preferably comprises at least 10%, more preferably at least 40%, and preferably less than 70% of a total multilayer film thickness. A core layer thickness below 10% of the total multilayer film thickness imparts inadequate film toughness and formability to the multilayer film. A core layer thickness greater than about 70% requires adjacent layers to be too thin to provide adequate interlayer cohesive strength. The core layer preferably exhibits an average melting point of greater than 100° C. so as to not melt or significantly soften in boiling water. The "average melting point" is a weighted average of individual melting points of resins used in the core layer.

An adhesive layer can join a tie layer to an outer layer such as a thermoplastic layer or metal surface. Therefore, an adhesive layer is desirably adhesively compatible with a tie layer and an outer layer, preferably with a thermoplastic layer and/or a metal surface, more preferably with a thermoplastic layer and/or a primed metal surface. Adhesive layers, in films comprising more than one adhesive layer, can have the same composition or different compositions.

The adhesive layer comprises a blend of a polar-modified polyolefin, as defined for the tie layer, and a polyester, copolyester, or polyester/copolyester blend. The modified polyolefin can serve a number of purposes in the adhesive layer including increasing adhesive layer viscosity to improve adhesive layer distribution during co-extrusion, increase adhesive compatibility with the tie layer, decrease the cost of the adhesive layer, and improve moisture resistance of the adhesive layer. The polyester or copolyester component provides enhanced adhesion to an adjacent adhered polyester thermoplastic polymer surface layer and/or to a polyester primed metal surface. Additionally, the polyester or copolyester component can increase the average melting point of the adhesive layer composition. The adhesive layer is preferably solvent-free and desirably exhibits an average melting point greater than 100° C. An adhesive layer having an average melting point below 100° C. can melt, lose adhesive strength and delaminate in boiling water.

Typically, the polar-modified polyolefin comprises at least 10 weight-percent (wt %), preferably at least 20 wt %; and typically less than 70 wt %, preferably less than 60 wt % of the total adhesive layer. The polyester, copolyester, or polyester/copolyester blend component comprises at least 30 wt %, preferably at least 40 wt %; and typically less than 90 wt %, preferably less than 80 wt % of the total adhesive layer weight. If the polyester, copolyester, or polyester/copolyester blend is less than 30 wt % of the adhesive layer weight, the adhesive layer tends to have poor adhesion to primed metal surfaces and/or thermoplastic layers. If the polyester, copolyester, or polyester/copolyester blend is greater than 90 wt % of the adhesive layer weight, the adhesive layer tends to have poor adhesion to the tie layer. The polar-modified polyolefin and polyester, copolyester, or polyester/copolyester blend comprise 100 wt % of the adhesive layer, or less if additives are included.

The polyester and copolyester blend components comprise reaction products of terephthalic acid, isophthalic acid or adipic acid with ethylene glycol, butanediol or hexanediol. These polyester and copolyester resins exhibit melting point temperatures of from about 80° C. to about 225° C., preferably from about 100° C. to about 150° C.; and exhibit glass transition temperatures of from about −30° C. to about 60° C., preferably from about −5° C. to about 30° C. The preferred polyester and copolyester resins have a relatively low weight-average molecular weight ($M_w$) of from about 10,000 to about 40,000, resulting in relatively low melt viscosities of from 100 to 2,000 Pascal-seconds (Pa-s) at 160° C. and 2.16 kilogram (kg) (DIN/ISO 1133). Polyester and copolyester resins with the prescribed preferred properties are typically hot melt adhesive resins. Preferred copolyester components for the adhesive layer include those commercially available as GRILTEX® (trademark of EMS-CHEMIE) D1519, GRILTEX D1440, GRILTEX D1619, GRILTEX 6, and GRILTEX 9 copolyesters. Additional copolyester resins which are suitable for the adhesive layer composition are DYNAPOL® S copolyester (trademark of Huls Aktiengesellschaft), PLATHERM® copolyester (trademark of Elf Atochem North America), and copolyester hot melt adhesives from Bostik.

The multilayer film may contain a second adhesive layer, having first and second opposing surfaces, with the first surface of the second adhesive layer adhered to the second surface of the first tie layer. The second adhesive layer comprises a polar-modified polyolefin and a polyester, copolyester, or blend thereof as defined for the first adhesive layer. The composition of the second adhesive layer can be the same as or different from that of the first adhesive layer.

Each adhesive layer comprises at least 5%, preferably at least 10%; and preferably less than 20%, more preferably less than 15% of the total multilayer film thickness. Adhesive layers less than 5% of the total multilayer film thickness are insufficient for bonding the multilayer film to thermoplastic layers and/or metal surfaces. An adhesive layer thickness of at least 5% but less than 20% allows remaining layers to have enough film thickness to be effective.

Typically, a multilayer film of the present invention, in the absence of a thermoplastic polymer layer or metal surface, has a thickness of at least 1 mil (25.4 μm), preferably at least 2 mils (50.8 μm), more preferably at least 3 mils (76.2 μm) and typically less than 20 mils (508 μm), preferably less than 10 mils (254 μm), more preferably less than 8 mils (203 μm). A film having a thickness less than 1 mil (25.4 μm) lacks desired scratch or abrasion resistance, moisture resistance, and coating durability and formability. Films thicker than 20 mils (508 μm) are typically too soft to provide adequate surface hardness and difficult to form when laminated onto metal.

A multilayer film can comprise a first thermoplastic polymer layer adhered to the second surface of the first tie layer (in the absence of a second adhesive layer), the second surface of the first adhesive layer, or the second surface of a second adhesive layer.

The multilayer film may also comprise a second thermoplastic polymer layer wherein the first thermoplastic polymer layer is adhered to the second surface of first adhesive layer and the second thermoplastic polymer layer is adhered to the second surface of either a second adhesive layer or the first tie layer (in the absence of a second adhesive layer). The second thermoplastic polymer layer may be the same as or different from the first thermoplastic layer.

The first and second thermoplastic polymer layers can comprise any standard thermoplastic polymer. The thermoplastic polymer layers preferably provide a durable, relatively glossy, high modulus or stiffness, hard, easily cleaned, scratch resistant surface. Preferred polymers for the thermoplastic polymer layers include polystyrene (PS), oriented PS, oriented crystalline or semi-crystalline polyester and copolyester, oriented or non-oriented amorphous copolyester and polyester, oriented PP, oriented and non oriented polyamides, acrylics (such as polymethyl-methacrylate), and polycarbonates. More preferred polymers for the thermoplastic polymer layers include oriented crystalline and semi-crystalline polyester and oriented and non-oriented amorphous copolyester and polyester. The most preferred polymer is non-oriented amorphous polyester. In order to impart desired hardness, scratch resistance and stiffness to the multilayer film laminate, the thermoplastic polymer layer desirably exhibits a film tensile modulus (as determined by ASTM method D882) of at least 200,000 pounds-per-square-inch (psi) (1380 Mega-Pascals, MPa), preferably at least 250,000 psi (1725 Mpa). Typically, the thermoplastic polymer layers have a gauge of at least 0.4 mils (10 μm), preferably at least 0.5 mils (13 μm); and typically not more than 5.0 mils (127 μm), preferably not more than 1.5 mils (38 μm). Thermoplastic layers having a thickness below 0.4 mils (10 μm) exhibit inadequate laminate scratch and abrasion resistance. Laminates with thermoplastic layer(s) thicker than 5 mils (127 μm) typically exhibit excessive modulus or stiffness, resulting in a tendency toward curling of the laminate unless a thermoplastic film of similar modulus is on both sides of the laminate. Laminates with thermoplastic layers thicker than 5 mils (127 μm) also tend to exhibit poor formability onto metal.

Adhere a thermoplastic layer to a multilayer film using any conventional means. Suitable means include direct coextrusion of the thermoplastic polymer layer as part of the multilayer film, extrusion coating of the thermoplastic polymer layer onto a previously produced multilayer film, extrusion of the thermoplastic polymer layer into a separate monolayer film and subsequently thermally laminating it onto the surface of the previously made multilayer film adhesive layer, or extrusion of the thermoplastic layer into a separate monolayer film and then adhering it to the previously made multilayer film using a liquid adhesive, such as a solvent-borne or an aqueous adhesive, or a low viscosity hot melt adhesive. If the thermoplastic polymer layer is a separate film and then subsequently adhered to the multilayer film, the thermoplastic polymer layer can be oriented (monoaxially or biaxially) or non-oriented.

One suitable thermoplastic polymer layer is a biaxially oriented polyester film, such as MYLAR® (trademark of E.I. du Pont de Nemours and Company), MELINEX® (trademark of E.I. du Pont de Nemours and Company), TERPHANE® (trademark of Toray Plastics Europe S.A.), HOSTAPHAN® (trademark of Hoechst Aktiengesellshaft) and DIAFOIL® (trademark of Diafoil Hoechst Co., LTD.). Modifying these films with a surface treatment for improving bonding or adhesion properties to a polyester is acceptable. Suitable surface treatments include corona, flame, or plasma treatment and coating with a surface coating, such as a copolyester or polyvinylidene chloride (PVDC) emulsion or dispersion.

Non-oriented amorphous or semi-crystalline polyester or copolyester films are also suitable as the thermoplastic layer. Suitable non-oriented amorphous or semi-crystalline polyester or copolyester films include monolayer films made from EASTAR® PETG 6763 copolyester, EASTAPAK® 9921 polyester or EASTOBOND® 19411 copolyester (EASTAR and EASTAPAK are trademarks of Eastman Chemical Company, EASTOBOND is a trademark of Eastman Kodak Company).

Optionally, the thermoplastic polymer layer and/or at least one layer of the multilayer film includes pigments or other conventional film additives such as anti-blocking agents, antioxidants or ultraviolet (UV) stabilizers, fire retardants, and fillers. Suitable pigments include titanium dioxide and carbon black, as well as conventional organic or inorganic colored pigments. Suitable fire retardants include chlorinated paraffin, antimony oxide, decabromodiphenyl oxide, aluminum trihydrate, and magnesium hydroxide. Suitable fillers include calcium carbonate. In one preferred embodiment, the core layer contains sufficient titanium dioxide to make the multilayer film both opaque and white.

Suitable techniques for preparing the multilayer film of the present invention include conventional tubular blown or slot die cast film processes. All of the layers can be prepared and laminated simultaneously into a single structure using a coextrusion feedblock. Non-limiting examples include simultaneous coextrusion of 4-layer "ABCB" structures wherein the "A" layer is an adhesive layer, the "B" layers are tie layers, and the "C" layer is a core layer; "ABCB*" structures wherein B and B* are different tie layers; symmetrical 5-layer "ABCBA" structures; asymmetrical 5-layer "ABCBA*" structures, wherein the "A" and "A*" layers are different adhesive layers differing in composition; and an asymmetrical "ABCB*A*" structures comprising different tie layers "B" and "B*" and different adhesive layers "A" and "A*".

Preparation and lamination of the multilayer film may comprise any of a number of sequential steps. For example, a symmetrical five-layer film having a first adhesive layer/first tie layer/core layer/second tie layer/second adhesive layer structure can be prepared in two steps: (a) co-extrude a first adhesive layer/first tie layer/core layer structure through a feedblock insert to divide the film into two symmetrical films; (b) melt bond together the core layers of the two symmetrical films prepared in step (a). Instead of using a feedblock insert, the co-extruded structure prepared in step (a) may be folded so as to contact the core layer with itself prior to melt bonding in step (b). A non-symmetrical five-layer film having a first adhesive-layer/first tie-layer/core-layer/second tie-layer/second adhesive-layer structure can be prepared in three steps: (a) co-extrude a first adhesive layer/first tie layer/core layer structure; (b) co-extrude a core layer/second tie layer/second adhesive layer structure; and (c) melt bond together the core layers of the structure prepared in steps (a) and (b).

A preferred non-oriented multilayer film of the present invention is adherable to a metal surface. For example, the second surface of the first adhesive layer, the second surface of a second adhesive layer, or the second surface of the first tie layer (in the absence of a second adhesive layer) can adhere to a metal surface.

One may also adhere the multilayer film to a first and second metal surface. The second surface of the first adhesive layer can be adhered to the first metal surface while the second surface of either a second adhesive layer or the first tie layer (in the absence of a second adhesive layer) can be adhered to the second metal surface.

One may adhere the multilayer film to both a metal surface and a thermoplastic polymer layer. For example, the second surface of the first adhesive layer may be adhered to a metal surface and the second surface of either a second adhesive layer or the first tie layer (in the absence of a second adhesive layer) may be adhered to a thermoplastic polymer layer. Alternatively, the second surface of the first adhesive layer may be adhered to a thermoplastic polymer layer and either the second surface of the second adhesive layer or the second surface of the first tie layer (in the absence of a second adhesive layer) may be adhered to a metal surface.

Suitable metal surfaces include non-primed and primed steel, zinc galvanized steel, tin-plated steel, and aluminum. The metal surfaces may comprise a chromate or phosphate-based surface treatment. Coating the metal surface prior to adhesion using solvent or aqueous-based primers is acceptable. Suitable primers include those that are epoxy-based such as epoxy-phosphate, epoxy-ester, epoxy-phenolic, epoxy-amine; and those that are polyester-based such as polyester-amine, polyester-melamine or polyester-melamine-formaldehyde. These primers can additionally contain passivating agents or pigments, such as powdered zinc and zinc chromate. Preferred metal surfaces include primed steel; and more preferred are steel primed with a polyester-based or epoxy-based primer; and most preferred are steel primed with polyester-melamine cured primers.

Typically, laminate films to primed steel at temperatures of 300–450° F. (149–232° C.). Once laminated to a metal surface, the layers of the multilayer film have an interlayer cohesive strength of at least 5 pounds per inch (lb/inch) (0.88 Newtons per millimeter (N/mm)), as determined by ASTM D-903. Similarly, the film, once adhered to a metal surface, exhibits peel strength values of greater than 5 lb/inch (0.88 Newtons per millimeter (N/mm)), as determined by the same ASTM method. The film preferably remains adhered to the metal in boiling water for at least 1 hour with no significant delamination, more preferably with absolutely no delamination occurring.

Preferably, once laminated to a metal surface, the film remains completely laminated to the metal surface through an "Adhesion After Indentation" test (European Coil Coating Association Test Methods Copyright 1996 ECCA-T6 [1995]) which utilizes an Erichsen Ball test. Alternatively, one may use a similar procedure, known as the Olsen ball punch deformation test of metallic sheet (ASTM E643). The "Adhesion After Indentation" test procedure involves cutting the film laminate with a knife blade in an "X" pattern and then punch forming a dimple from the metal side, centered on the "X" pattern, leaving a base around the dimple. More preferably, the film remains completely laminated to the metal after immersing the cut and dimpled sample from the "Adhesion After Indentation" test in boiling water for 1 hour (Indented Boiling Water Test).

Generally, films of the present invention that contain a thermoplastic layer consisting essentially of non-oriented amorphous or semi-crystalline polyester or copolyester demonstrate better adhesion to the metal during the "Adhesion After Indentation" test and the subsequent Indented Boiling Water Test than films containing an oriented polyester thermoplastic layer. One possible explanation for the better performance of amorphous polyester, without being bound by theory, is that the amorphous polyester has less inherent stress than oriented polyester, allowing the amorphous polyester to be more flexible when deformed and undergo less conformational changes when heated. In contrast, oriented films comprising oriented polyester as the thermoplastic layer tend to shrink and delaminate from the metal during the Indented Boiling Water Test.

The following examples further illustrate, but do not limit, the invention.

EXAMPLE (EX) 1

Symmetrical Multilayer "ABCBA" Film with Polypropylene Core

Produce a 5 layer symmetrical "ABCBA" co-extruded film of 5.0 mil (127 µm) thickness on a slot die cast film line using 3 extruders, dividing output from the "A" extruder and "B" extruder using feedblock inserts, and then co-extruding the 5 films in an ABCBA configuration, having opposing first and second "A" (adhesive) layers.

The "A" extruder produces the output for the adhesive layers ("A" layers), each of which make up about 11% of the total film thickness. Each adhesive layer is a blend of 75 wt % copolyester hot melt adhesive blend (GRILTEX D1519E), 20 wt % EVA copolymer resin (ELVAX® 3190, trademark of E.I. du Pont de Nemours and Company), and 5 wt % antiblock PE compound (CN-734, a masterbatch of 15% silicon dioxide and 85% LDPE, from Southwest Chemical Services, a business unit of MA Hanna). Extrude the adhesive layer with the following extruder temperature profile: zone 1 set at 250° F. (121° C.), zone 2 set at 260° F. (127° C.), zone 3 set at 270° F. (132° C.), and zone 4, adapter and transfer line set at 280° F. (138° C.).

The "B" extruder produces the output for the tie layers ("B" layers), each of which make up about 7% of the total film thickness. Each tie layer contains a blend of 70 wt % MAH-g-PP (BYNEL™ 50E-571, trademark of E.I. du Pont de Nemours and Company) and 30 wt % MAH-g-EVA (FUSABOND® MC190, trademark of duPont Canada Inc.). Extrude the tie layer with the following extruder temperature profile: zone 1 set at 310° F. (154° C.), zone 2 set at 320° F. (160° C.), and zone 3, adapter and transfer line set at 340° F. (171° C.).

The "C" layer makes up about 64% of the total film thickness and contains 55 wt % PP copolymer (INSPIRE® C103-04, trademark of The Dow Chemical Company), 30% MAH-g-PP (same as used in the "B" layer) and 15 wt % White PP color masterbatch (AMPACET® 11343, masterbatch of 50% titanium dioxide and 50% polypropylene, trademark of Ampacet Corporation). The extruder temperature profile for the "C" layer is: zone 1 set at 340° F. (171° C.), zone 2 set at 380° F. (193° F.), and zone 3, adapter and transfer line set at 410° F. (210° C.)

Co-extrude the layers in an "ABCBA" orientation through a die set at a temperature of 350° F. (177° C.). Cast the film onto a 75° F. (24° C.) casting roll and collect the resulting multilayer "ABCBA" film.

EX 2

Symmetrical Multilayer "ABCBA" Film with Polypropylene Core

Co-extrude a second symmetrical multilayer "ABCBA"-type film as in Ex 1 except the "C" layer formulation contains INSPIRE C707-12 PP copolymer (MFR of 12 g/10 min.) instead of INSPIRE C103-04 (MFR of 4 g/10 min.). Additionally, each "A" layer accounts for about 10% of the film thickness, each "B" layer accounts for about 15% of the film thickness, and the "C" layer accounts for about 50% of the film thickness.

EX 3

Symmetrical "ABCBA" Multilayer Film with Polyethylene Core

Co-extrude a symmetrical 5-layer "ABCBA"-type multilayer film having opposing first and second "A" (adhesive) layers as in Ex 1 with the following changes:

Each "A" layer is about 15% of the film thickness. The "A" layer extrusion temperature profile is: 260° F. (127° C.), 270° F. (132° C.), 290° F. (143° C.), and 300° F. (149° C.).

Each "B" layer is about 10% of the film thickness and contains 60 wt % MAH-g-EVA (BYNEL E-418) and 40 wt % EVA resin (ELVAX 3190). The "B" layer extrusion temperature profile is 270° F. (132° C.), 280° C. (138° C.), 290° F. (143° C.), and 300° F. (149° C).

The "C" layer is about 50% of the film thickness and contains a blend of 60 wt % LLDPE resin (DOWLEX® 2035, trademark of The Dow Chemical Company), 20 wt % LDPE (LDPE 4005) and 20 wt % White PE color masterbatch (AMPACET 11560, masterbatch of 50% titanium dioxide and 50% polyethylene). The "C" extrusion temperature profile is 350° C. (177° C.), 375° F. (191° C.), and 400° F. (204° C.).

Co-extrude the multilayer film through a die at 340° F. (171° C.) and cast onto a 75° F. (24° C.) casting roll.

EX 4

Multilayer "TABCBA" Film Laminate with a Polyethylene Core

Prepare a multilayer film containing a thermoplastic polymer ("T") layer by laminating a film of oriented polyester (MP15, 0.6 mil, 15 µm gauge, from Mitsubishi Polyester Film, L.L.C.) to the first "A" layer of the Ex 3 multilayer film. Place the oriented polyester film on an adhesive layer of the multilayer film and laminate by hot roll lamination at a rate of 13 meters per minute. The roll temperature on the oriented polyester side is 100° C. while the roll on the multilayer film side is not heated. Apply a pressure of 5 bar (500 kilopascals) during the lamination. The resulting material is a six-layer polymeric film laminate having a "TABCBA" structure.

EX 5

Multilayer "ABCBT" Film

Prepare a 3.0 mil (76 μm) thick three-layer "CBT" co-extruded film on a cast line using three extruders. A "C" layer extruder produces the output containing the "core" layer at about 55% of film thickness. The "C" layer is identical in composition to the "C" layer of Ex 1. The extruder temperature profile for the core layer is: 340° F. (171° C.), 390° F. (199° C.), and 410° F. (210° C.). A "B" extruder produces the "B" layer, which makes up about 15% of the film thickness. The "B" layer contains 100 wt % MAH-g-EVA (BYNEL E-418). The "B" layer extruder temperature profile is 250° F. (121° C.), 270° F. (132° C.), and 290° F. (143° C.). A "T" layer extruder produces the "T" layer, which makes up about 30% of the total film thickness. The "T" layer is 100% polyester (PET) resin (EASTAPAK 9921). The "T" layer extruder temperature profile is 460° F. (238° C.), 470° F. (243° C.), and 475° F. (246° C.)

Prepare a 3.0 mil (76 μm) thick three-layer "CBA" co-extruded film on a cast line using three extruders. The "C" and "B" layers are the same in composition and relative thickness as those in the "CBT" film. The "C" layer extruder temperature profile in the "CBT" film, however, is 340° F. (171° C.), 380° F. (193° C.), and 410° F. (210° C.). The "A" extruder provides the "A" layer, which makes up about 30% of the film thickness. The "A" layer has the same composition as the "A" layer in Ex 1. The "A" layer extruder temperature profile is 250° F. (121° C.), 260° F. (127° C.), and 270° F. (132° C.)

Laminate the "CBT" film and "CBA" film together by hot rolling at a temperature greater than 320° F. (160° C.) with the "C" layers of each film in contact with each other to produce a 6.0 mil (152 μm) thick "ABCBT" film.

EX 6

Multilayer Film Laminate Adhered to a Metal Surface to Create an "TABCBAM" Composition Laminate the six layer film of Example 4 to a metal surface ("M") consisting of a steel surface primed with a polyester primer. Pre-heat the primed metal to 200–237° C. using infrared heaters. Position the film on the primed metal surface with the second "A" layer contacting the pre-heated primed metal surface to form a pre-lamination composition. Run the heated pre-laminate composition at a rate of 60 meters per minute through nip rollers that apply a pressure of 6 bar (600 kilopascals), producing a multilayer film adhered to a metal surface and having an "TABCBAM" composition. Quench the laminate in water to cool.

The polyolefin film laminate adheres to the metal with a adhesive peel strength of greater than 8 lb/inch (1.4 N/mm), as determined by ASTM method D-903.

Cut a 3.5 inch×3.5 inch (9 cm×9 cm) square panel of the laminate and cut an "X" through the multilayer film to the metal from corner to corner. The multilayer film remains laminated (that is, no delamination is visible between the multilayer film and the metal surface) after immersing the panel in boiling water (100° C.) for 4 hours ("Flat Panel Boiling Water Test").

EX 7–10

"TABCBAM" Laminates Having a Multilayer Film Adhered to a Metal ("M") Surface and Different Polyester Polymer ("T") Layers First, produce four 5-layer symmetrical "ABCBA" co-extruded films of 5.0 mil (127 μm) thickness on a slot die cast film line using 3 extruders, dividing output from the "A" extruder and "B" extruder using feedblock inserts, and then co-extruding the 5 films in an ABCBA configuration, in a manner similar to that described in Ex 1. The 5-layer film has first and second "A" layers on opposing sides of the 5-layer film. The "A" layers, each 10% of the total film gauge, comprise a blend of 75 wt % GRILTEX D1519 copolyester, 20 wt % ELVAX 3190 EVA, and 5 wt % CN734 antiblock concentrate. The "A" layer has an average melting point of 115° C. Extrude the "A" layers at the same temperatures as in Example 1. The "B" tie layers, each 10% of film gauge, comprise 50 wt % FUSABOND MC190 EVA-graft-MAH, 30 wt % ELVAX 3190 EVA, and 20 wt % AMPACET 11560 TiO2 pigment concentrate. Extrude the "B" layers as described for the "B: layers of Example 1. The "C" layer, which is 60% of the film gauge, contains a precompounded blend of 60 wt % polypropylene copolymer (INSPIRE C103-04), 15 wt % MAH-g-PP (FUSABOND MD353), and 25 wt % white PE masterbatch (AMPACET 11560 masterbatch). The "C" layer has an average melting point of 130° C. Ramp the "C" extruder zones from 360° F. to 400° F. (182° F. to 204° C.).

Co-extrude the layers in an "ABCBA" orientation through a die set at a temperature of 350° F. (177° C.). Cast the film onto a 75° F. (24° C.) casting roll and collect the resulting multilayer "ABCBA" film.

Extrude a first monolayer polyester film on a cast film line by extruding an amorphous copolyester resin (EASTAR 6763 PETG) into a 1.0 mil (25 μ,) monolayer film using an extruder ramped from 370° F. to 400° F. (188° C. to 204° C.) and a die at 400° F. (204° C.). Quench the film onto a cast roll at 130° F. (54° C.) and wind up. The first monolayer polyester film has a tensile modulus of 280,000 psi (1900 Mpa), as determined according to ASTM method D882.

Extrude a second monolayer polyester film on a cast film line by extruding a polyester resin (EASTPAK 9921 PET) into a 1.0 mil (25 μm) monolayer film using an extruder ramped from 450° F. to 520° F. (232° C. to 271° C.) and a die at 520° F. (271° C.). Quench the film onto a cast roll at 145° F. (63° C.) and wind up. The second monolayer polyester film has a tensile modulus of 320,000 psi (2200 Mpa), as determined according to ASTM method D882.

A third monolayer polyester film is a 0.75 mil (19 μm) biaxially oriented polyester film (MYLAR 75LBT). The third monolayer polyester film has a tensile modulus of 500,000 psi (3450 Mpa), as determined according to ASTM method D882.

A fourth monolayer polyester film is a 0.6 mil (15 μm) biaxially oriented polyester film (TERPHANE® 10.23/15, trademark of Rhone-Poulenc Films).

Prepare Ex 7 by placing the first monolayer polyester film onto an "A" layer of one of the "ABCBA" co-extruded films. Then, place the other "A" layer in contact with a polyester-melamine primer layer coated on a steel panel that is at a temperature of 400° F. (204° C.) and laminate using a nip roller. The heat from the metal melts and fuses the first and second adhesive layers to the first monolayer polyester film and the primer, respectively.

Prepare Ex 8–10 similarly to Ex 7, substituting respectively the second, third, and fourth monolayer polyester films for the first monolayer polyester film. The resulting Examples are summarized as follows:

Ex 7: first monolayer polyester film/ABCBAM
Ex 8: second monolayer polyester film/ABCBAM
Ex 9: third monolayer polyester film/ABCBAM
Ex 10: fourth monolayer polyester film/ABCBAM Ex 7–10 all exhibit adhesion strength to the metal greater than 7 lb/inch (1.2 N/mm) and remain laminated through the Flat Panel Boiling Water Test. Additionally, Ex 7–10 remain laminated after the Adhesion After Indentation test. Furthermore, Ex 7 and Ex 8 remain laminated during the Indented Boiling Water Test. Due to the stable adhesion to the metal surface through these tests, Ex 7 and Ex 8 represent preferred compositions for metal surface protection.

Ex 9 and Ex 10 (each containing an oriented polyester layer) demonstrate partial delamination in the Indented Boiling Water Test with 1–2 mm of shrinkage along each cut of the "X". Due to the less stable adhesion to the metal surface face through the Indented Boiling Water Test, Ex 9 and Ex 10 are less preferred for metal surface protection in environments exposed to hot and humid environments.

What is claimed is:

1. A structure comprising a non-oriented multilayer film, wherein said multilayer film comprises:
   (a) a first tie layer having opposing first and second surfaces;
   (b) a polyolefin core layer comprising 40 weight-percent or less homogeneous ethylene/alpha-olefin copolymer and having opposing first and second surfaces with the first surface of the core layer adhered to the first surface of the first tie layer;
   (c) a second tie layer having opposing first and second surfaces with the first surface of the second tie layer adhered to the second surface of the core layer; and
   (d) a first adhesive layer having opposing first and second surfaces with the first surface of the first adhesive layer adhered to the second surface of the second tie layer; the adhesive layer comprising a blend of:
   (i) a polar-modified polyolefin; and
   (ii) a polyester, copolyester, or polyester/copolyester blend.

2. The structure of claim 1, wherein said tie layers comprise a polymer or blend of polymers selected from a group consisting of ethylene/vinyl acetate copolymer (EVA); ethylene/methacrylate copolymer; ethylene/n-butyl acrylate; ethylene/vinyl acetate/carbon monoxide; ethylene/acrylic acid (EAA); ethylene/methacrylic acid (EMAA); ionomeric salts of ethylene/carboxylic acid copolymers such as sodium, zinc or potassium ionomers of EMAA or EAA; maleic anhydride grafted EVA; maleic anhydride grafted linear low-density polyethylene; and maleic anhydride grafted polypropylene.

3. The structure of claim 1, wherein at least one tie layer comprises a polymer selected from a group consisting of maleic anhydride grafted ethylene/vinyl acetate copolymer, maleic anhydride grafted linear low-density polyethylene, and maleic anhydride grafted polypropylene.

4. The structure of claim 1, wherein said core layer comprises a polymer selected from a group consisting of linear low-density polyethylene, high-density polyethylene, and propylene-ethylene copolymers.

5. The structure of claim 1, wherein said multilayer film further comprises a thermoplastic polymer layer adhered to the second surface of at least one layer selected from the first tie layer and the first adhesive layer.

6. The structure of claim 5, wherein said thermoplastic polymer layer(s) comprises a polymer selected from a group consisting of polystyrene, oriented polystyrene, oriented crystalline and semi-crystalline polyester and copolyester, oriented and non-oriented amorphous copolyester and polyester, oriented polypropylene, polyamide, acrylics, and polycarbonate.

7. The structure of claim 1, further comprising a metal surface adhered to said second surface of at least one layer selected from the first tie layer and the second adhesive layer.

8. The structure of claim 7, wherein said metal surface is primed steel containing a polyester-based primer.

9. The structure of claim 7, wherein said multilayer film remains adhered to said metal surface during a Flat Panel Boiling Water test.

10. The structure of claim 1, wherein said adhesive layer comprises from 40 weight-percent to 90 weight-percent of a copolyester, based on the weight of the adhesive layer.

11. The structure of claim 1, wherein said multilayer film further comprises a second adhesive layer having opposing first and second surfaces with the first surface of the second adhesive layer adhered to the second surface of the first tie layer; the second adhesive layer comprising:
   (iii) a polar-modified polyolefin; and
   (iv) a polymer selected from a group consisting of polyesters, copolyesters, and blends thereof.

12. The structure of claim 11, wherein said multilayer film further comprises a thermoplastic polymer layer adhered to the second surface of at least one layer selected from the first and second adhesive layer.

13. The structure of claim 12, wherein said thermoplastic polymer layer(s) comprises a polymer selected from a group consisting of polystyrene, oriented polystyrene, oriented crystalline and semi-crystalline polyester and copolyester, oriented and non-oriented amorphous copolyester and polyester, oriented polypropylene, polyamide, acrylics, and polycarbonate.

14. The structure of claim 11, further comprising a metal surface adhered to the second surface of at least one layer selected from the first and first adhesive layer.

15. The structure of claim 14, wherein said metal surface (s) is a primed steel containing a polyester-based primer.

16. The structure of claim 14, wherein the multilayer film remains adhered to said metal surface during a Flat Panel Boiling Water test.

17. The structure of claim 11, wherein at least one adhesive layer comprises from 40 weight-percent to 90 weight-percent of a copolyester, based on the weight of the adhesive layer.

18. The structure of claim 1, further comprising:
   (e) a second adhesive layer having opposing first and second surfaces with the first surface of the second adhesive layer adhered to the second surface of the first tie layer;
   (f) a thermoplastic layer comprising an oriented polyester and having opposing first and second surfaces with the first surface of the thermoplastic layer adhered to the second surface of the second adhesive layer; and
   (g) a primed metal surface to which the second surface of the first adhesive layer is adhered.

19. The structure of claim 1, further comprising:
   (e) a second adhesive layer having opposing first and second surfaces with the first surface of the second adhesive layer adhered to the second surface of the first tie layer;
   (f) a thermoplastic layer comprising a non-oriented amorphous or semicrystalline polyester, copolyester, or polyester/polyester blend; wherein the thermoplastic layer has opposing first and second surfaces with the first surface adhered to the second surface of the second adhesive layer; and (g) a primed metal surface to which the second surface of the first adhesive layer is adhered.

* * * * *